United States Patent [19]
Eggert

[11] Patent Number: 5,472,345
[45] Date of Patent: Dec. 5, 1995

[54] GYNECOLOGICAL SIMULATOR

[75] Inventor: John S. Eggert, Miami, Fla.

[73] Assignee: Gaumard Scientific Company, Inc., Miami, Fla.

[21] Appl. No.: 136,220

[22] Filed: Oct. 13, 1993

Related U.S. Application Data

[63] Continuation-in-part of Ser. No. 7,093, Apr. 14, 1993, Pat. No. Des. 352,313.

[51] Int. Cl.$^6$ .................................. G09B 23/28
[52] U.S. Cl. ............................................. 434/273
[58] Field of Search ..................... 434/273, 272, 434/267, 262

[56] References Cited

U.S. PATENT DOCUMENTS

| | | | |
|---|---|---|---|
| 2,495,568 | 1/1950 | Coel | 434/273 |
| 3,766,666 | 10/1973 | Stroop | 434/273 |
| 3,797,130 | 3/1974 | Knapp et al. | |
| 3,921,311 | 11/1975 | Beasley et al. | 434/273 |
| 4,439,162 | 3/1984 | Blaine | 434/273 X |
| 5,061,187 | 10/1991 | Jerath | 434/273 X |
| 5,104,328 | 4/1992 | Lounsbury | |

OTHER PUBLICATIONS

Gaumard Scientific Company, Inc.; The SIMA; 1989; vol. 3; pp. 1–5.
Gaumard Scientific Company, Inc., SIMA; 1991; vol. 6

Primary Examiner—Gene Mancene
Assistant Examiner—Jeffrey A. Smith
Attorney, Agent, or Firm—Haynes and Boone

[57] ABSTRACT

A gynecological simulator for training medical personnel in gynecological procedures includes a body simulating the torso of a human female having an internal cavity therein. A flexible vagina having a proximal end fixed to the body and a distal end extending inwardly into the cavity removably receives a securely retained cervix and a rotatable uterus by means of a locking ring and locking cap, respectively, both threadably engaged to a threaded pedestal secured to the cervix. Fallopian tubes, ovaries and round ligaments are provided removably attached to the uterus, and incisions are disposed in the skin encasing the simulator for enabling laparoscopy and minilaparotomy to be performed on the fallopian tubes.

23 Claims, 5 Drawing Sheets

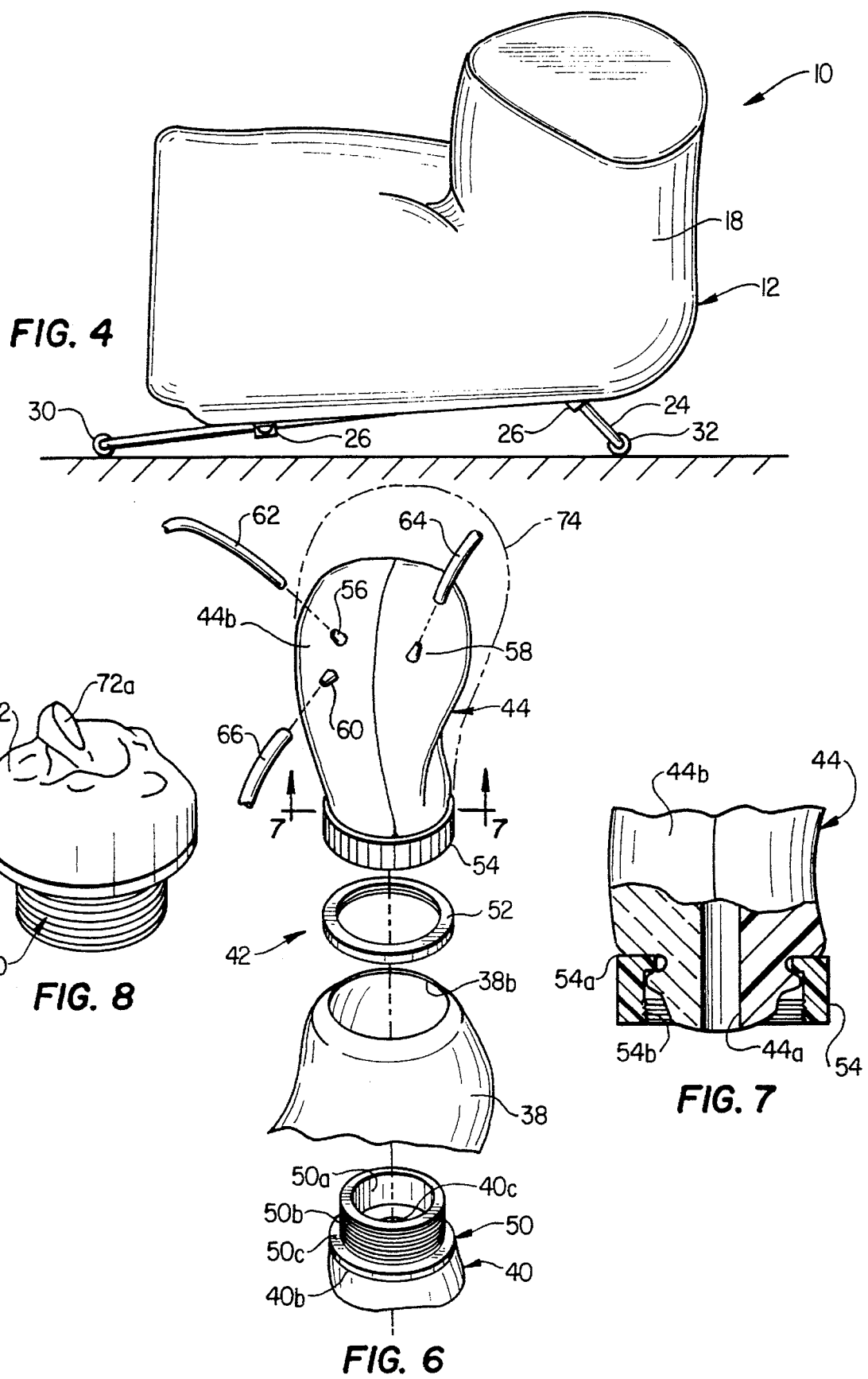

GYNECOLOGICAL SIMULATOR

CROSS-REFERENCE TO RELATED APPLICATION

This application is a continuation-in-part of patent application Ser. No. 29/007,093 filed Apr. 14, 1993 (now U.S. Pat. No. D. 352,313).

TECHNICAL FIELD

The present invention relates generally to teaching devices in the medical field, and specifically, to a gynecological simulator used to assist in teaching female pelvic examination techniques, palpation methodology for locating and assessing the condition of the female reproductive organs, insertion and removal of intrauterine contraceptive devices (IUDs), and the minimally invasive surgical procedures of laparoscopy and minilaparotomy.

BACKGROUND OF THE INVENTION

The training of medical personnel in the art of gynecological techniques, as with all medical procedures, is hampered by the unavailability of live patients willing to be practiced on and the undesirability of allowing untrained personnel from performing life affecting, and possibly threatening, medical procedures. Typically, medical students are trained in techniques such as laparoscopy and minilaparotomy and IUD insertion through study in combination with observing and assisting trained physicians. Thus, the advantages of hands-on training are not provided.

To provide more realistic training, mannequins and components have been created that simulate the human body. These mannequins offer physicians and medical students the training opportunity to repeatedly perform medical procedures until perfected. The mannequins, however, must realistically simulate human anatomy to be of much value. While it is fairly simple to model the exterior shape of human body parts, it has proved quite difficult to accurately model internal organs to provide a competent training adjunct in the gynecological field.

To serve as a training tool, a gynecological simulator should enable students to practice common gynecological procedures such as administering pelvic examinations, IUD insertion and identification of normal and diseased cervices. As a solution, gynecological simulators have duplicated the exterior of the female lower torso, including the vulva and vagina such that they are capable of receiving a speculum. Attached to the distal end of these vaginas are molded cervices and uteri for inspection during practiced pelvic examinations. Cervices provided with a simulator can be diseased to aid in disease identification. Further, uteri can be provided with cut out sections to enable viewing of IUD insertion and removal.

Gynecological simulators, however, have had limited utility as training devices due to the difficulty in modeling the female reproductive organs. Simulators have included cervices and uteri for inspection but have failed to realistically model the female anatomy. In particular, during a routine pelvic examination, the doctor grasps the cervix with a tenaculum forcep to pull the cervix toward the labia for taking tissue samples. Further, the uterus is often elevated and/or rotated to enable the physician to palpate the top and sides of the uterus, the fallopian tubes and the ovaries. Practice of these procedures has been unavailable or limited because the cervices contained in gynecological simulators disengage from the simulator when grasped or pulled and the uteri have been fixed in location and non-rotatable. Moreover, simulated training in the techniques of laparoscopy and minilaparotomy for tubal sterilization procedures has been unavailable.

What is needed is a gynecological simulator capable of more accurately modeling the female reproductive organs, and that securely retains the cervix but also allows elevation and rotation of the uterus. In addition, such a gynecological simulator should provide training in minimally invasive surgical procedures such as laparoscopy and minilaparotomy while enhancing palpation and IUD insertion training.

SUMMARY OF THE INVENTION

The foregoing problems are solved and a technical advance is achieved by a gynecological simulator that more accurately models the female reproductive organs to provide increased training of medical personnel in gynecological procedures. In a departure from the art, the gynecological simulator includes a securely retained cervix and a rotatable uterus complete with fallopian tubes, ovaries and round ligaments. Incisions are disposed in the skin encasing the simulator for enabling laparoscopy and minilaparotomy to be performed on the fallopian tubes.

In an illustrative embodiment, the gynecological simulator comprises a torso formed to simulate the lower torso of a full sized adult female, the torso primarily comprising a hollow body defining a cavity for receiving replicas of the female reproductive organs, a flexible outer skin having openings for receiving surgical tools and a foam shell molded to fit between the body and the skin. A stand is slidably attached to the back side of the body to enable the simulator to be stable in both upright and examination orientations.

The body includes a simulated vagina extending inwardly into the cavity. A dome-shaped simulated cervix having an os is removably mounted to and within the distal end of the vagina by means of a connection mechanism. A bulb-shaped simulated uterus having an internal chamber capable of receiving an IUD extending from the proximal end of the uterus is also removably mounted to the connection mechanism and extends inwardly into the cavity. The uterus includes a transparent top portion and an integrally formed circular molded ridge surrounding the proximal end of the uterus.

The connection mechanism includes a cylindrical threaded pedestal, a locking ring having internal threads for threaded engagement with the threads of the pedestal and a locking cap having an annular flange and an internally threaded bore also for threaded engagement with the threads of the pedestal. The pedestal is securely glued to the cervix, and the locking cap is rotatably secured to the proximal end of the uterus by press fitting the annular flange over the ridge formed near the proximal end of the uterus. To attach the cervix and the uterus to the vagina, the pedestal is inserted through the distal end of the vagina, leaving the cervix within the vagina. The locking ring is threaded onto the pedestal, thereby clamping a portion of the vagina between the flange and the locking ring, securely fixing the cervix to the distal end of the vagina. The locking cap is then threaded onto the pedestal, rotatably securing the uterus within the cavity. When both the cervix and the uterus are attached to the connection mechanism, the os aligns with the chamber in the uterus to form a continuous bore.

Slip fittings extend from the uterus for removably receiving soft silicon rubber tubes representative of fallopian tubes, ovarian ligaments and round ligaments. Removably attached to the distal end of the fallopian tubes are simulated fimbria, and removably attached to the distal end of the ovarian ligaments are simulated ovaries. Similarly, the distal end of the round ligaments are removably attached to the sides of the body.

The gynecological simulator includes several simulated cervices containing protuberances representative of disease or other abnormality, and includes both an anteverted and retroverted uterus, as well as a ten week old pregnant uterus and a postpartum uterus.

The invention results in several technical advantages. Generally, the invention enables medical personnel to receive enhanced training in gynecological procedures prior to working on live patients. For example, providing a securely disposed cervix at the distal end of the vagina enables training in grasping the cervix with tenaculum forceps and pulling it toward the labia as is done when taking tissue samples.

A further technical advantage is the ability to train students in palpation techniques by providing a rotatable uterus, and one that can be lifted either manually or with a uterine elevator.

A further technical advantage is the ability to train students in many different real life conditions that they may experience in later practice by enabling the cervices, uteri and fallopian tubes of the invention to be interchangeable and easily replaceable.

A further technical advantage is the ability to train students in the tubal sterilization techniques of laparoscopy and minilaparotomy by providing manipulatable and replaceable fallopian tubes and incisions in the outer skin of the simulator to facilitate the introduction of the necessary surgical tools.

A further technical advantage is the ability to easily stand the simulator in an upright position, as well as to easily place it in the appropriate orientation for performing the above-mentioned medical procedures.

A further technical advantage is the use of the invention as a demonstration model for laymen to teach the workings of the female reproductive organs and their position in the body, as well as to demonstrate the above-mentioned medical procedures that they might be considering having performed.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings wherein:

FIG. 4 is a side view of the invention shown in FIG. 1 placed in an orientation used during operation of the invention;

FIG. 6 is an enlarged, exploded view showing the uterus and cervix connection;

FIG. 7 is an enlarged, partial cross-sectional view taken along the line 7—7 of FIG. 6;

FIG. 8 is a perspective view of an inverted, diseased cervix; and

DESCRIPTION OF THE PREFERRED EMBODIMENTS

Figure 1:
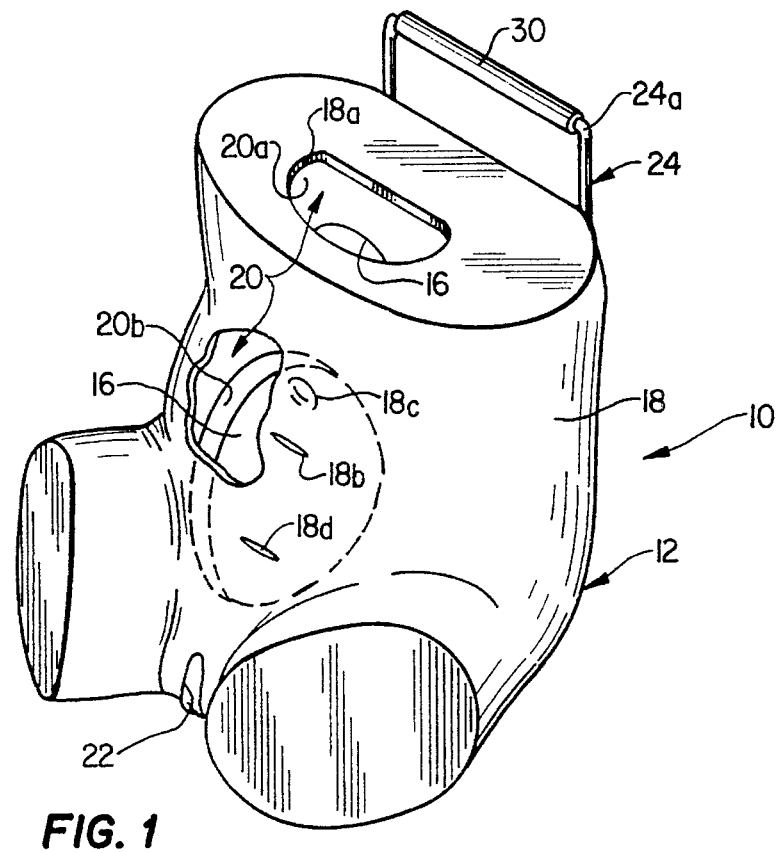
FIG. 1 is a perspective view of the invention with a small portion cut-away.
Figure 2:
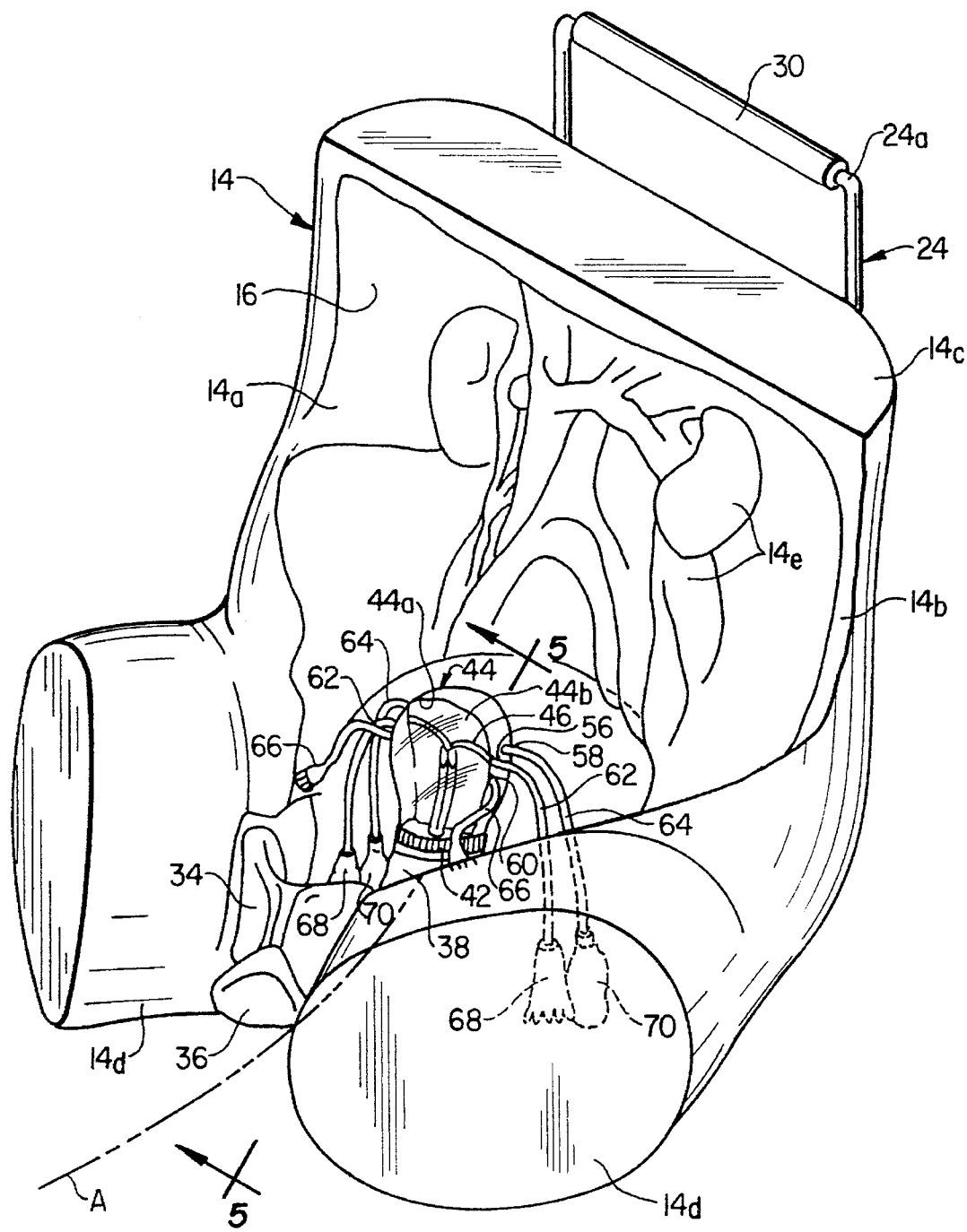
FIG. 2 is an enlarged perspective view of the invention shown in FIG. 1 with the outer skin and foam shell removed.

In FIG. 1, the reference numeral 10 designates a gynecological simulator embodying features of the present invention. The simulator 10 includes a torso 12 formed to simulate the lower torso of a full sized adult female, it being understood that the torso 12 could be sized to represent any female age and build. Referring to FIG. 2, the torso 12 comprises a hollow body 14 having sides 14a and 14b, a semi-oval protruding top 14c and cutoff leg portions 14d defining a cavity 16 for receiving replicas of the female reproductive organs. Internal organs 14e formed in the body 14 extend into the cavity 16 and can be appropriately painted to represent the kidneys, iliac arteries, and other internal structures of the abdomen.

Figure 3:
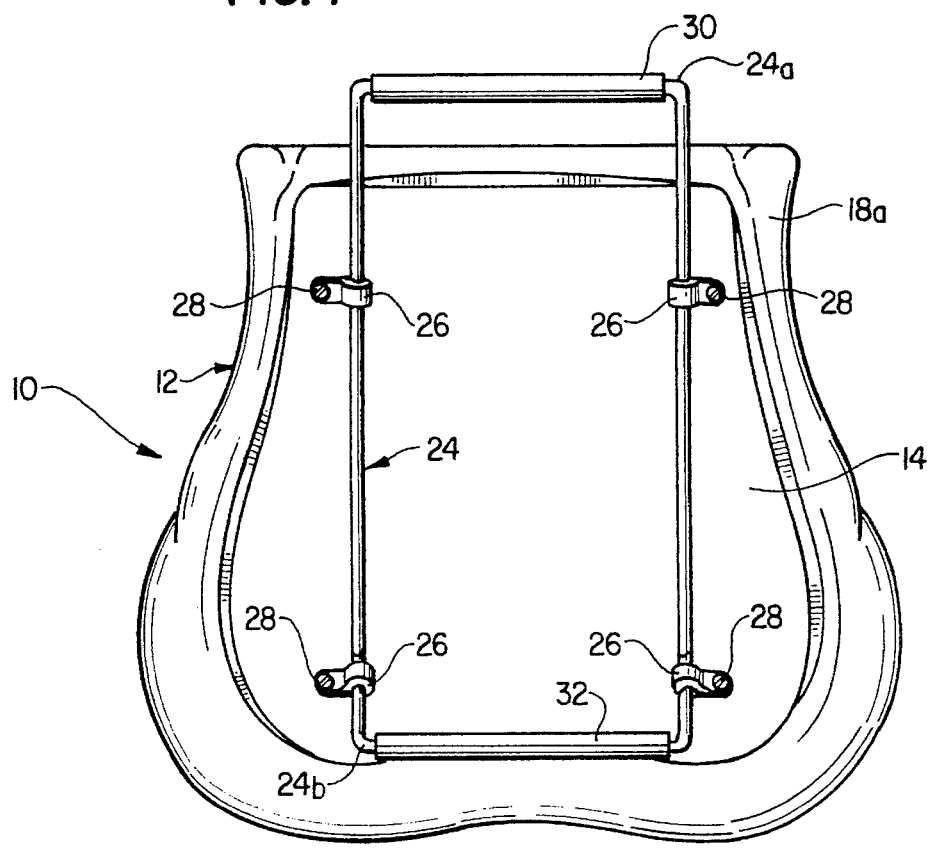
FIG. 3 is a back plan view of the invention shown in FIG. 1.

Referring now to FIGS. 1–3, the torso 12 further comprises a flexible outer skin 18 having a skirt 19 for wrapping around the sides 14a and 14b, the top 14c and the leg portions 14d of the body 14, the skin 18 having life-like color, texture and reaction to touch to simulate the skin of a female patient. A complementary foam shell 20 molded to fit between the body 14 and the skin 18 provides the skin 18 the give of a human body. The shell 20 has engaging surfaces (not shown) corresponding to the sides 14a and 14b, the top 14c and the leg portions 14d of the body 14 to snugly fit to the body 14 and further define the cavity 16. In assembled form, the skin 18 is stretched over the shell 20 and the body 14 until the skirt 19 wraps around the back edges of the body 14 as shown in FIG. 3. The body 14 and the skin 18 are preferably formed of differing durometers of vinyl plastisol through rotational molding and the shell 20 is preferably molded of polyurethane, all as is commonly known in the art, to provide a realistic model of a female torso.

The skin 18 and the shell 20 have numerous openings including an upwardly facing semicircular opening 18a in the skin 18 aligned with a semicircular opening 20a in the shell 20 to provide access into the body 14 for reasons described below. Additionally, an upper incision 18b disposed just below a representation of an umbilicus 18c and a short transverse lower incision 18d disposed a few centimeters above the usual location of the symphysis pubis (not shown) extend through the skin 18 and are located above a circular opening 20b in the shell 20 for inserting medical devices into the cavity 16 as is more fully described in connection with FIG. 9. A simulated first vaginal portion 22 having labia and a ribbed, open-ended cylindrical member (not shown) representative of vaginal walls, extends inwardly into the cavity 16 through an aligned opening (not shown) in the shell 20 is also formed through the skin 18 and is further described below.

Referring to FIGS. 3 and 4, a stand 24 formed of a metal rod bent into a generally rectangular pattern having parallel upper and lower portions 24a and 24b is slidably mounted to the back of the body 14 by brackets 26 secured to the body 14 by screws 28. As more clearly shown in FIG. 4, the stand 24 is bent at a slightly obtuse angle near the lower portion 24b for reasons described below. Elastomeric tubes 30 and 32 sheathe the upper and lower portions 24a and 24b of the stand 24, respectively, to act as handle and foot, the tubes 30 and 32 having longitudinal slits allowing them to envelop such portions.

Figure 5:
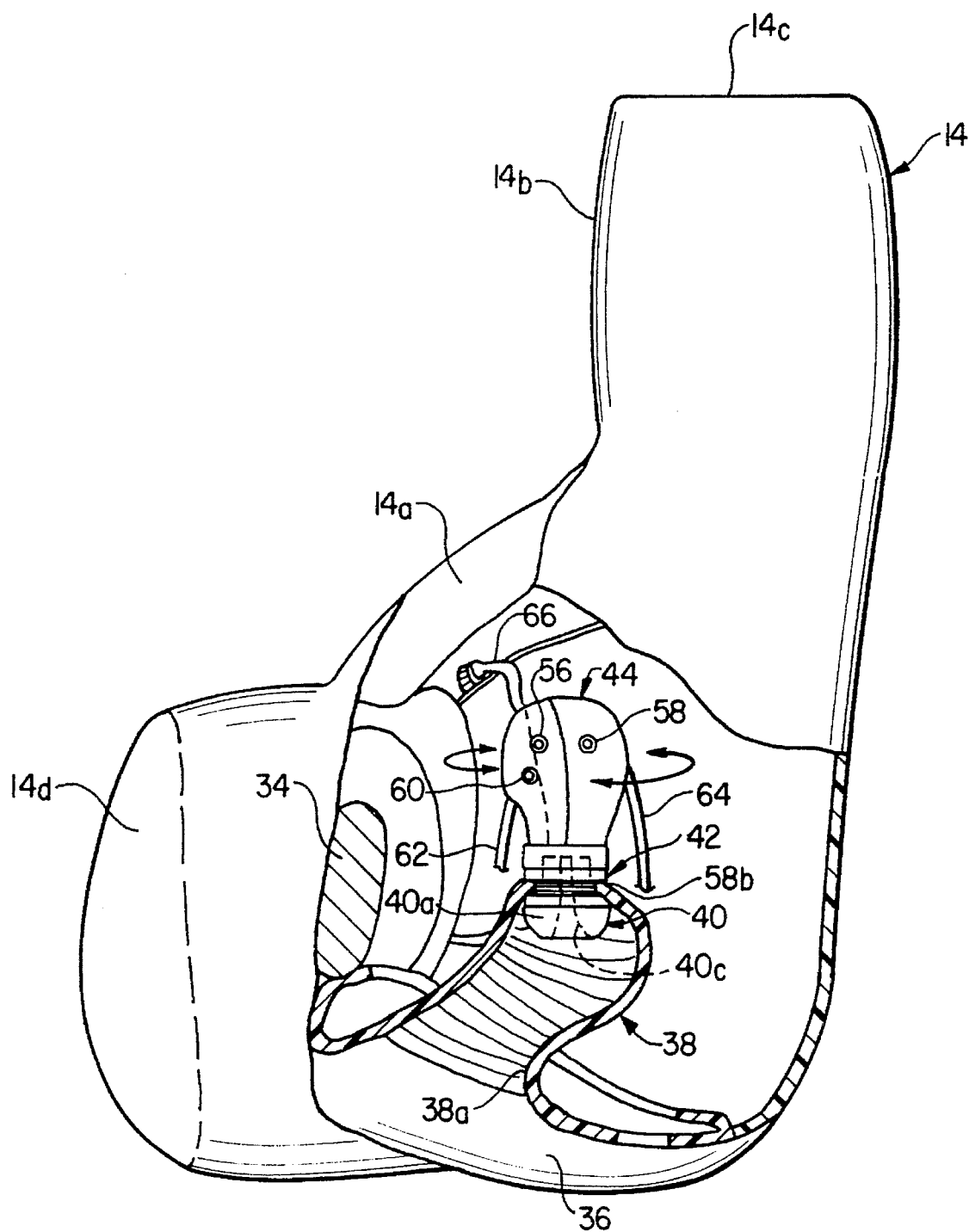
FIG. 5 is a partial cross-sectional view taken along the line 5—5 of FIG. 2.

Referring to FIGS. 2 and 5, a simulated pubic bone 34 is fixed to and extends between the leg portions 14d of the body 14. A simulated introitus 36 disposed beneath the pubic bone 34 is also fixed between the leg portions 14d of the body 14 for receiving the first vaginal portion 22. A flexible, ribbed simulated second vaginal portion 38 having a proximal end 38a integral with the introitus 36 extends inwardly and upwardly into the cavity 16 behind the pubic bone 34, terminating with an opening 38b at its distal end. The diameter of the second vaginal portion 38 is slightly larger than the diameter of the cylindrical member (not shown) of the first vaginal portion 22 to enable the cylindrical member of the first vaginal portion 22 to be received within the second vaginal portion 38.

A dome-shaped simulated cervix 40 having a domed surface 40a, a flat surface 40b and an internal os (bore) 40c extending therethrough, is removably mounted to and within the distal end of the second vaginal portion 38 by means of a connection mechanism 42 extending through the opening 38b. A bulb-shaped (either anteverted or retroverted) simulated uterus 44 having an internal chamber 44a (capable of receiving an IUD 46 such as a Copper T-380) extending from the proximal end of the uterus 44 is also removably mounted to the connection mechanism 42 and extends inwardly into the cavity 16 from the opening 38b of the second vaginal portion 38. The uterus 44 includes a transparent top portion 44b and an integrally formed circular molded ridge 44c surrounding the proximal end of the uterus 44 and concentric with the opening to the chamber 44a for reasons to be described.

Referring to FIGS. 6 and 7, the connection mechanism 42 includes a cylindrical threaded pedestal 50 having an internal bore 50a, external threads 50b and a circular flange 50c; a locking ring 52 having internal threads for threaded engagement with the threads 50b of the pedestal 50; and a locking cap 54 having an annular flange 54a and an internally threaded bore 54b also for threaded engagement with the threads 50b of the pedestal 50.

The flange 50c of the pedestal 50 is securely glued to the flat surface 40b of the cervix 40. Alternatively, a neck having an internal bore aligned with the os 40c extends from the flat surface 40b of the cervix 40 and is press fit into the bore 50a for providing additional surface area for attaching the cervix 40 to the pedestal 50. The locking cap 54 is rotatably secured to the proximal end of the uterus 44 by press fitting the annular flange 54a over the ridge 44c formed near the proximal end of the uterus 44, as shown in FIG. 7.

To attach the cervix 40 and the uterus 44 to the second vaginal portion 38, the pedestal 50 is inserted through the opening 38b from within the second vaginal portion 38, leaving the cervix 40 within the vagina. The locking ring 52 is threaded onto the threads 50b of the pedestal 50, thereby clamping a portion of the second vaginal portion 38 surrounding the opening 38b between the flange 50c and the locking ring 52, securely fixing the cervix 40 to the distal end of the second vaginal portion 38. The locking cap is then threaded onto the threads 50b of the pedestal 50, rotatably securing the uterus 44 within the cavity 16. When both the cervix 40 and the uterus 44 are attached to the connection mechanism 42, the os 40c aligns with the chamber 44a, as well as with the first vaginal portion 22 and second vaginal portion 38 to form a continuous bore as represented by the dotted line A in FIG. 2.

As shown in FIG. 6, three slip fittings 56, 58 and 60, respectively, extend from a side of the uterus 44 for removably receiving soft silicon rubber tubes representative of a fallopian tube 62, an ovarian ligament 64 and a round ligament 66, respectively. Removably attached to the distal end of the fallopian tube 62 via a slip fitting (not shown) is a simulated fimbria 68 see FIG. 9, and removably attached to the distal end of the ovarian ligament 64 via a slip fitting (not shown) is a simulated ovary 70 (see FIG. 9). Similarly, the distal end of the round ligament 66 is removably attached via a slip fitting (not shown) to the side 14b of the body 14. It is understood that a simulated fimbria and ovary are also removably attached to the opposite side of the uterus 44 via soft silicon rubber tubes and slip fittings, as well as an additional round ligament, but as a matter of convenience, such structures are not discussed but are referenced with the same reference numerals as their counterparts.

Referring now to FIG. 8, an alternative cervix 72 attached to a pedestal 50 is shown. The cervix 72 has a domed surface 72a containing protuberances representative of disease or other abnormality, the surface 72a preferably being painted to exhibit the look of a known cervical disease or abnormality. The gynecological simulator 10 preferably includes five normal cervices, as well as numerous abnormal cervices that exhibit, for example, squamous epithelium, exaggerated columnar epithelium, retention cyst and cervical polyp, or carcinoma of the cervix. In addition, the gynecological simulator 10 preferably includes both an anteverted and retroverted uterus, as well as ten and twenty week old pregnant uteri 74 (generally shown in phantom lines in FIG. 6), the twenty week old pregnant uterus also simulating a postpartum uterus for reasons described below. The pubic bone 34, the introitus 36, the second vaginal portion 38, the cervix 40, the uterus 44, the fimbria 68 and the ovaries 70, as well as all of the additional cervices and uteri are preferably rotationally molded from differing durometers of vinyl plastisol as is common in the art.

In operation, the gynecological simulator 10 is used generally to assist in teaching female pelvic examination techniques, palpation methodology for locating and assessing the condition of the female reproductive organs, insertion and removal of IUDs, and the minimally invasive surgical procedures of laparoscopy and minilaparotomy. To use the gynecological simulator 10, a cervix 40 and a uterus 44 are secured to the distal end of the second vaginal portion 38 using the connection mechanism 42 as previously described. Any of the various cervices or uteri may by used to simulate real life medical conditions that are likely to occur. Once the uterus 44 is secured, the fallopian tubes 62, fimbria 68, ovarian ligaments 64, ovaries 70 and round ligaments 66 are connected to the various slip fittings on the uterus 44. To assemble the torso 12, the skin 18 is stretched over the shell 20 prior to placing the shell 20 on the body 14. Thereafter, the shell 20 is placed on the body 14 and the skin 18 is stretched over the assembly until the skirt 18a wraps around the back edges of the body 14 as shown in FIG. 3. The gynecological simulator 10 is now ready for use.

To practice pelvic examination techniques, the simulator 10 is rotated such that it rests on both the handle and foot of the stand 24 to orient the simulator 10 in the proper examination position, the elastomeric tubes 30 and 32 preventing the simulator 10 from sliding. A speculum (not shown) is inserted into the first vaginal portion 22 to expand the walls of the first vaginal portion 22 and second vaginal 38 to enable observation of the cervix 40. A tenaculum forcep can also be inserted into the first vaginal portion 22 to grasp the cervix 40 and pull it towards the labia to simulate the taking of tissue samples for pathology studies.

Palpation techniques can be practiced using the simulator 10, as well. Typically, elevation or lifting of the uterus is required to perform palpation. The uterus 44 can be lifted in at least three ways. First, a uterine elevator (not shown) can be inserted through the speculum and the os 40c of the cervix 40 into the cavity 44a of the uterus 44 to elevate the uterus 44 to the desired location. As the uterus 44 is freely rotatable, the uterine elevator can be manipulated to rotate the uterus 44 to allow palpation of the sides of the uterus 44, as well as of the fallopian tubes 62 and the ovarian ligaments 64. Second, the uterus 44 can be elevated using the standard bimanual examination technique. Third, the uterus 44 can be manually lifted by the instructor by inserting his forearm into the cavity 16 via the openings 18a and 20a. Note that the shell 20 does not inhibit palpation training as the opening 20b in the shell 20 is located between the uterus 44 and the tummy of the simulator 10.

To practice IUD insertion techniques, the skin 18 and the shell 20 are first preferably removed to expose the uterus 44. Then an IUD inserter (not shown) is inserted into the vagina 22, through the os 40c of the cervix 40 and into the chamber 44a of the uterus 40. As the top portion 44b of the uterus 44 is transparent and the skin 18 and the shell 20 have been removed, the trainee can actually view the insertion of the IUD 46 into the uterus to determine if the wings of the IUD 46 have properly expanded. Similarly, IUD removal techniques can be practiced and improved as visualization of the procedure is made possible.

Figure 9:
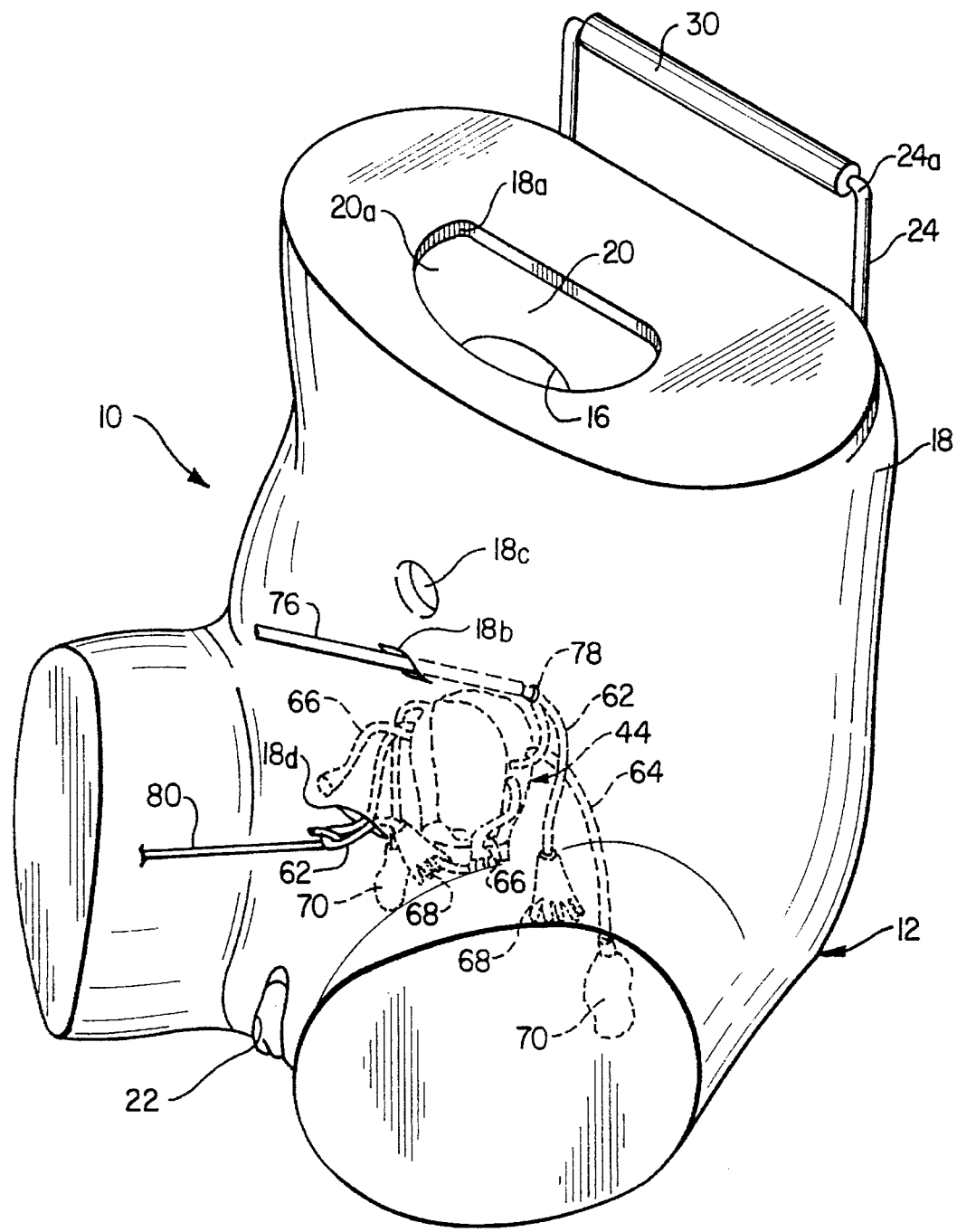
FIG. 9 is an enlarged perspective view of the invention shown in FIG. 1 with portions of the internal organs shown in phantom.

The gynecological simulator 10 can also be used to practice laparoscopy and minilaparotomy. Referring to FIG. 9, a laparoscope 76 is inserted through the incision 18b in the skin 18 and into the cavity 16 through the opening 20b in the shell 20 to engage the fallopian tubes 62, it being understood that the insertion angle of the laparoscope 76 has been altered for the ease of presentment. The fallopian tubes 62, being realistically simulated, are engagable by the laparoscope 76 to enable the trainee using the simulator 10 to practice placing a small silicone rubber ring 78, such as a Falope-Ring®, on each fallopian tube 62 to ligate the tube and prevent passage of an ovum.

Alternatively, minilaparotomy can be practiced by inserting a a tubal hook 80 through the incision 18d in the skin 18 and into the cavity 16 through the opening 20b in the shell 20 to engage the fallopian tubes 62. The tubal hook 80 is used to remove a portion of the fallopian tube 62 through the incision 18d to enable the fallopian tube 62 to be ligated and/or resected. Multiple fallopian tubes 62 are included with the gynecological simulator 10 to allow repeated practice.

Several technical advantages result from the foregoing. Generally, the gynecological simulator 10 enables medical personnel to receive enhanced training in gynecological procedures prior to working on live patients. For example, providing a securely fixed cervix 40 at the distal end of the second vaginal portion 38 enables training in grasping the cervix with tenaculum forceps and pulling it toward the labia as is done when taking tissue samples, without having the cervix 40 disengage from the simulator.

The gynecological simulator 10 enables students to train in palpation techniques by providing a rotatable uterus, and one that can be lifted either with a uterine elevator or manually, and then either by the instructor or through use of the standard bimanual examination technique. Palpation training is further enhanced by the simulation of pregnant uteri, the fallopian tubes, ovarian ducts and round ligaments which can be felt through the skin 18. The simulator 10 further enables students to be trained in many different real life conditions that they may experience in later practice by enabling the cervices, uteri and fallopian tubes of the invention to be interchangeable and easily replaceable. In particular, the connection mechanism 42 allows the uterus 44 to be connected without having to rotate the entire uterus as the locking cap 54 freely rotatable. This feature of the simulator 10 is particularly advantageous when inserting the large, simulated pregnant uteri.

The simulator 10 also enables students to train in the tubal sterilization techniques of laparoscopy and minilaparotomy by providing manipulatable and replaceable fallopian tubes and incisions in the outer skin of the simulator to facilitate the introduction of the necessary surgical tools. In addition, the openings 18a and 20a provide a means for lighting the cavity 16 during such procedures. Post partum tubal procedures can also be taught as the twenty week pregnant uterus is also the size of a postpartum uterus.

With the aid of the stand 24, the simulator 10 is easily oriented in an upright position when not in use, as well as in the appropriate orientation for performing the above-mentioned medical procedures. Moreover, the elastomeric handle 30 and foot 32 prevent slippage of the simulator 10 while in use.

The simulator 10 may also be used as a demonstration model for laymen to teach the workings of the female reproductive organs and their position in the body, and to demonstrate to patients the above-mentioned medical procedures and others such as diaphragm insertion.

It is also understood that variations may be made in the present invention without departing from the spirit and scope of the invention. For example, additional simulated organs can be disposed within the cavity 16, such as a bowel, bladder or colon. In addition, the pregnant uteri can include internal structure to allow MVA techniques such as vacuum aspiration to be practiced.

Although illustrative embodiments of the present invention have been shown and described, a wide range of modification, change and substitution is intended in the foregoing disclosure, and in certain instances some features of the invention may be employed without a corresponding use of other features. Accordingly, it is appropriate that the appended claims be construed broadly and in a manner consistent with the scope of the invention.

What is claimed is:

1. A gynecological simulator, comprising:

a simulated human torso having an internal cavity therein;

a flexible simulated vagina having a proximal end fixed to said torso and a distal end extending inwardly into said cavity and having an opening therein;

a simulated cervix removably mounted in said opening and extending proximally within said vagina;

a simulated uterus removably and rotatably mounted to said cervix extending within said cavity; and said uterus comprising a rotatable cap secured to a proximal end of said uterus for rotatably and removably mounting said proximal end of said uterus to said cervix thereby allowing said uterus to be rotated relative to said torso about an axis which is perpendicular to a transverse axis of said simulated torso;

a plurality of spaced slip fittings extending outward from said uterus and a plurality of flexible tubes removably attached to said slip fittings.

2. The gynecological simulator of claim 1 wherein said uterus has an internal chamber for receiving an IUD.

3. The gynecological simulator of claim 2 wherein said uterus comprises a transparent portion for viewing the contents of said chamber.

4. The gynecological simulator of claim 2 wherein said cervix has an internal bore aligned with said chamber of said uterus.

5. A gynecological simulator, comprising:

a simulated human torso having an internal cavity therein;

at least one flexible tube simulating a fallopian tube contained within said cavity; and a flexible skin covering said cavity, said skin having a vaginal opening and at least one additional opening for receiving a medical device.

6. The gynecological simulator of claim 5 further comprising at least one simulated fimbria removably attached to the distal end of said fallopian tube.

7. The gynecological simulator of claim 5 further comprising at least one flexible tube simulating ovarian ligaments contained within said cavity and at least one simulated ovary removably attached to the distal end of said ovarian ligament.

8. The gynecological simulator of claim 5 further comprising at least one flexible tube simulating a round ligament contained within said cavity and removably attached at least one wall of said torso.

9. The gynecological simulator of claim 5 wherein said medical device comprises a laparoscope which engages said at least one opening and extends into said cavity to engage said flexible tube.

10. The gynecological simulator of claim 5 wherein said at least one additional opening receives a medical device to enable a user to perform one or more of stapling, cutting, lasing, viewing and ligating procedures.

11. A gynecological simulator, comprising:

a simulated human torso having an internal cavity therein;

a flexible vagina having a proximal end fixed to said simulated torso and a distal end extending inwardly into said cavity and having an opening therein;

a cervix extending proximally within said vagina from said opening;

a uterus extending within said cavity from said opening;

means for removably connecting said cervix and said uterus to said vagina, said connecting means comprising a cylindrical threaded pedestal, a locking ring having internal threads for threading engagement with said threads of said pedestal, and a locking cap having an annular flange and an internally threaded bore also for threaded engagement with said threads of said pedestal; and a stand mounted to a back of said torso for orienting said simulator in a plurality of examination positions and preventing said simulator from sliding.

12. The gynecological simulator of claim 11 wherein said uterus comprises a transparent top portion.

13. The gynecological simulator of claim 8 wherein said pedestal is secured to said cervix, and said locking cap is rotatably secured to the proximal end of said uterus.

14. The gynecological simulator of claim 13 wherein said pedestal is inserted through said distal end of said vagina and extends into said cavity while said cervix extends within said vagina, said locking ring threadably engages said pedestal, thereby clamping a portion of said vagina between said locking ring and said cervix, thereby securely fixing said cervix to said distal end of said vagina.

15. The gynecological simulator of claim 14 wherein said locking cap threadably engages said pedestal, rotatably securing said uterus within said cavity.

16. The gynecological simulator of claim 15 wherein said bore of said cervix and said chamber of said uterus are coaxially aligned to form a continuous bore.

17. The gynecological simulator of claim 11 wherein said stand comprises a metal rod bent into a generally rectangular pattern having parallel upper and lower portions and parallel side portions, said upper and lower rod portions orienting said simulator in said proper examination position and preventing said simulator from sliding.

18. The gynecological simulator of claim 11 further comprising first and second elastomeric tubes sheathing said upper and lower portions of said rod, respectively, said sheathed upper portion of said rod acting as a handle and said sheathed lower portion of said rod acting as a foot.

19. A kit for practicing gynecological procedures, comprising:

means simulating the torso of a human female having an internal cavity therein;

a flexible vagina having a proximal end fixed to said simulating means and a distal end extending inwardly into said cavity;

a plurality of cervices capable of being removably mounted to said distal end of said vagina;

a plurality of uteri capable of being removably and rotatably mounted to said distal end of said vagina;

a plurality of flexible tubes representative of fallopian tubes capable of being removably attached to said uteri;

wherein each of said uteri comprises a rotatable cap secured to a proximal end of said uterus for rotatably and removably mounting said proximal end of said uterus to said distal end of said vagina, thereby allowing said uterus to be rotated relative to said torso about an axis which is perpendicular to a transverse axis of said simulated torso; and a plurality of spaced slip fittings extending outwardly from said uteri and a plurality of flexible tubes removably attached to said slip fittings.

20. The kit of claim 19 wherein some of said cervices contain indicia exhibiting abnormality or disease.

21. The kit of claim 19 wherein at least one of said uteri is a simulated pregnant uterus.

22. The kit of claim 19 wherein at least one of said uteri is a simulated postpartum uterus capable of being removably and rotatably mounted to said distal end of said vagina.

23. The kit of claim 19 wherein at least one of said uteri is anteverted and at least one of said uteri is retroverted.

* * * * *